United States Patent [19]
Coscia

[11] 3,918,690
[45] Nov. 11, 1975

[54] CLOSED MIXER FOR RUBBER, PLASTICS AND THE LIKE

[76] Inventor: Giovanni Coscia, Malnate, Italy

[22] Filed: Feb. 1, 1974

[21] Appl. No.: 438,681

Related U.S. Application Data

[63] Continuation of Ser. No. 275,048, July 25, 1972, abandoned.

[30] Foreign Application Priority Data
Aug. 11, 1971 Switzerland............... 011834/71

[52] U.S. Cl. ............................................. 259/191
[51] Int. Cl.² ........................................ B29B 1/06
[58] Field of Search .......... 259/194, 191, DIG. 2, 6, 259/104, 9, 10, 97; 425/377; 100/144, 145, 146

[56] References Cited
UNITED STATES PATENTS

| | | | |
|---|---|---|---|
| 1,355,305 | 10/1920 | Bowen | 259/194 |
| 1,523,184 | 1/1925 | Eger | 259/194 |
| 1,623,159 | 4/1927 | Bowen | 259/DIG. 2 |
| 2,688,769 | 9/1954 | Corbett | 425/377 |
| 2,868,517 | 1/1959 | Lasch | 259/6 |
| 3,702,691 | 11/1972 | Fritsch | 259/104 |

*Primary Examiner*—Robert W. Jenkins
*Attorney, Agent, or Firm*—Finnegan, Henderson, Farabow and Garrett

[57] ABSTRACT

A closed mixer for rubber, plastic materials and the like, comprising essentially a feeding assembly operated by a pneumatic or hydraulic piston and a mixing chamber with a rotor bearing two opposite threads which wind in right- and left-hand directions starting from the ends and meet on the medium zone of said rotor.

When the mixer operates, the whole material to be mixed is forced by the counteracting threads of the screw toward the center of the rotor itself, thus causing an intimate molecular mixing of the plastic mass without unduly heat generation.

3 Claims, 1 Drawing Figure

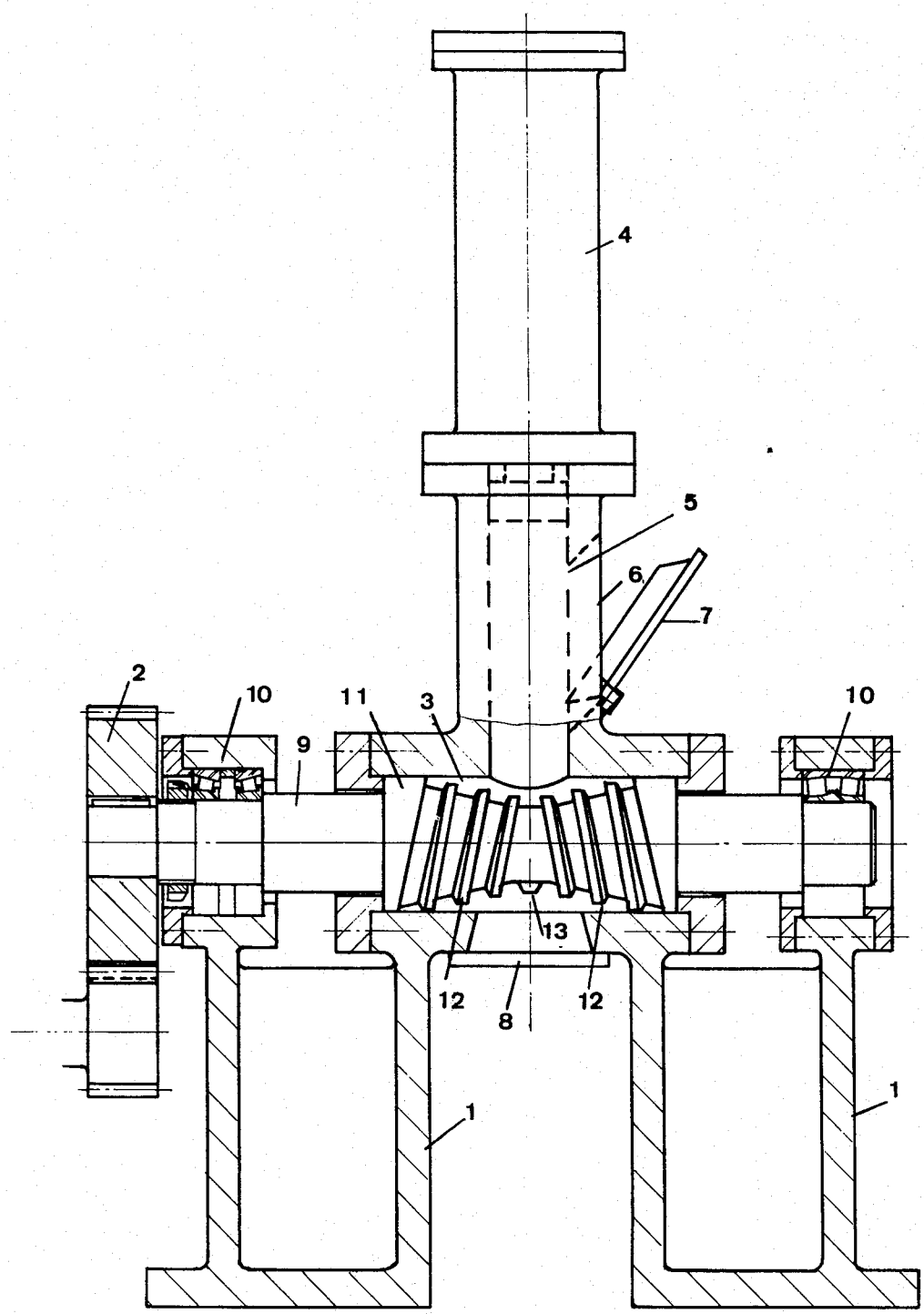

CLOSED MIXER FOR RUBBER, PLASTICS AND THE LIKE

This is a continuation, of application Ser. No. 275,048, filed July 25, 1972, now abandoned.

BACKGROUND OF THE INVENTION

The present invention concerns a mixer of the closed or internal type designed to be used in the rubber industry, plastics industry and other similar industries and, in particular, a mixer in which the rotor consists of a metal screw block with right- and left-hand threads.

It is common knowledge that, in the rubber and plastics industries, mixers are used which commonly fall into two main categories: mixers of open type and mixers of closed or internal type. The present invention concerns especially mixers of the second type and, particularly, integral mixers. A particular type of integral mixer is that commonly called Banbury. Mixers of this type generally consist of a closed basin or vat, provided with a cooling device in the interior of which two rotors or mixing blades rotate at different speeds for which reason the material does not adhere to the rotor or blades. Thus is obtained an effective kneading of the mixture between the blades and the walls of the vat. The blades are usually closed internally. It has eventually been revealed that such standard mixers offer various inconveniences as, for example: long mixing-cycle times due to the necessity of operating at low speed to reduce the heat generation, the presence of dead zones in the mixing chamber, high energy consumption, etc.

SUMMARY OF THE INVENTION

It is therefore an object of the present invention to supply a mixer which offers the advantage of reducing the mixing time in that, whit said mixer, it is possible to operate at high speed with less heat generation.

A further object of the present invention is to supply a mixer in whose mixing chamber all the material is in movement at the same time, so that there are no dead zones.

Another object of the present invention is to supply a mixer which requires less consumption of energy and has a lesser number of moving parts.

These and other objects are achieved in accordance with the present invention by means of a mixer of closed or internal type, characterized by the fact that the rotor consists of a metal screw block with right- and left-hand threads which meat on the center of the block.

DETAILED DESCRIPTION OF THE INVENTION

Further characteristics, objects and advantages of the mixer covered by the present invention will become evident to those skilled in the art from the following detailed description of one of its embodiments with reference to the single attached drawing which shows a schematic sectional view of such embodiment.

As in the case of all mixers of the closed type, also the mixer covered by the present invention comprises a base 1, a gear arrangement 2 for the motor drive, a mixing chamber 3 surmounted by a cylinder and piston assembly 4 of the oleodynamic or pneumatic type. Between the piston 4 and the mixing chamber 3 there are located a feed cylinder 5 and the feeding inlet 6 with pertinent door 7. A discharge opening 8 is located at the bottom of mixing chamber 3. A shaft 9, whose ends are supported in bearings 10 and 10', is integral with rotor 11 and serves to transmit the rotary movement produced by the gear arrangement 2.

As a fundamental characteristic of the present invention, rotor 11 is composed of a metal block having on its external surface screw-threads 12 and 12' which go respectively in left- and right-hand directions. The ends of the two threads meet at the point 13 which preferably is located on the center of the longitudinal axis of rotor 11.

When the mixer is put into operation, the material to be mixed is loaded into the appropriate opening 6 and then compressed by piston 4 into the mixing chamber 3' where the threaded block 11 rotates. The mixing effect is due principally to the fact that the material to be mixed is forced by the threads 12 and 12' of the screw toward the center 13 where the two threads meet. From this zone the material is then conveyed toward the opposite ends of threads 12 and 12', and in this movement the friction between the masses that meet produces a molecular stretching of the charged rubber or plastic material with subsequent mixing of the molecules of the various ingredients of the mix. These movements assure a continuity of mixing of the material during the entire rotation period of rotor 11.

The canal-like spaces necessary to permit the passage of the moving material in the mixing chamber lie between the internal surface of the mixing chamber 3 and the external surface of rotor 11. Such spaces can be shaped in various ways. In the embodiment shown in the attached drawing, which shows the preferred embodiment, the mixing chamber 3 is cylindrical while the rotor 11 is in the form of two truncated cones joined at the smaller bases.

In other embodiments the mixing chamber can be made in the form of a barrel and the screw rotor perfectly cylindrical or nearly cylindrical. In a further embodiment the mixing chamber can be made cylindrical with the rotor also cylindrical providing at least a peripheral canal on the internal surface of the cylindrical mixing chamber.

Also the construction of the threaded rotor 11 can vary within certain limits. For example the number of pitches can vary from 2 to 15 in accordance with the mixing requirements, the nature of the material and the construction of the mixer. The number of the starts is comprised, on the contrary, between 1 and 10 for each end of rotor 11.

Other additions and/or modifications can be made to the embodiments described above while remaining within the scope of the present invention. In fact, this embodiment was given only by way of example and not as a limitation of the invention itself.

What I claim is:

1. A closed mixer for rubber and plastic materials comprising:
   a. means comprising side and end rolls having internal surfaces defining an elongated closable mixing chamber, said chamber having a central portion and opposed end portions, said walls defining at least one opening therethrough in communication with said chamber for input and discharge of said materials;
   b. means for closing said opening during mixing to provide a completely closed mixing chamber;

c. a rotor operatively mounted in said chamber for rotation about an axis extending longitudinally within said chamber, said rotor including a screw block extending through said chamber between said end portions with right and left-hand threads starting from opposite end portions of said block respectively and meeting in the vicinity of the central portion of said chamber, with said screw block in the form of two truncated cones joined at the smaller ends of said cones, the threads of said block having surfaces in sufficiently spaced relation from the internal surfaces of said chamber to permit movement of material between the threads and said internal surfaces, the rotor being rotatable to cause the material to move along the threads toward the central portion and along the internal surfaces toward the ends of said chamber; and d. means operatively connected to said rotor for rotatably driving said rotor about said axis.

2. A closed mixer for rubber and plastic materials as recited in claim 1 wherein the number of revolutions of the screw threads on the screw block is between 2 and 15.

3. A closed mixer for rubber and plastic materials as recited in claim 1 wherein the number of threads on the screw block is between 1 and 10 for each end of the screw block.

* * * * *